(12) United States Patent
Wellenkamp et al.

(10) Patent No.: US 8,720,057 B2
(45) Date of Patent: May 13, 2014

(54) METHOD FOR RECONDITIONING A ROTOR OF A TURBOMACHINE

(75) Inventors: Ulrich Wellenkamp, Windisch (CH); Luis Federico Puerta, Rieden (CH); Wolfgang Kappis, Fislisbach (CH)

(73) Assignee: Alstom Technology Ltd, Baden (CH)

( * ) Notice: Subject to any disclaimer, the term of this patent is extended or adjusted under 35 U.S.C. 154(b) by 124 days.

(21) Appl. No.: 13/567,542

(22) Filed: Aug. 6, 2012

(65) Prior Publication Data

US 2013/0074336 A1    Mar. 28, 2013

(30) Foreign Application Priority Data

Aug. 9, 2011    (CH) .................................... 1312/11

(51) Int. Cl.
    *B23P 6/00*    (2006.01)
(52) U.S. Cl.
    USPC ..................... 29/889.1; 29/402.06; 29/402.09; 29/402.11; 29/402.13; 29/402.16
(58) Field of Classification Search
    CPC ............ B23P 6/00; B23P 6/002; B23P 6/045; F01D 5/005; F05B 2230/80
    USPC ............... 29/402.09, 402.11, 402.12, 402.13, 29/402.16, 889.1
    See application file for complete search history.

(56) References Cited

U.S. PATENT DOCUMENTS

| | | | |
|---|---|---|---|
| 5,232,346 A * | 8/1993 | Mitchell et al. ................ | 416/215 |
| 8,257,047 B2 * | 9/2012 | Mueller ..................... | 416/219 R |
| 2006/0222502 A1 * | 10/2006 | Hansen et al. ............. | 416/220 R |
| 2007/0048142 A1 | 3/2007 | Dambrine et al. | |
| 2009/0081046 A1 | 3/2009 | Mace et al. | |
| 2009/0087316 A1 * | 4/2009 | Mueller ..................... | 416/219 R |
| 2012/0107111 A1 * | 5/2012 | Wellenkamp et al. ...... | 415/209.3 |
| 2013/0247377 A1 * | 9/2013 | Hathiwala et al. ........... | 29/889.1 |

FOREIGN PATENT DOCUMENTS

DE    10346263 A1    4/2005

* cited by examiner

*Primary Examiner* — Alexander P Taousakis
(74) *Attorney, Agent, or Firm* — Buchanan Ingersoll & Rooney PC

(57) ABSTRACT

A method is provided for reconditioning a turbomachine rotor, equipped with circumferentially extending grooves for accommodating blades retained in the grooves at a distance from each other by spacers. The method includes removing the blades and spacers from the grooves and hollowing out the exposed grooves, simultaneously widening the grooves to remove damage-inflicted material. At least one circumferentially extending lateral groove is introduced for accommodating a filler piece in the grooves to fill a gap between blades and hollowed-out rotor grooves. New spacers are provided which are matched to the hollowed-out grooves and have recesses which are matched to the introduced lateral grooves. Filler pieces are provided for inserting into the circumferentially extending lateral grooves and recesses of the new spacers. The blades and new spacers are inserted into the hollowed-out rotor grooves and corresponding filler pieces are inserted into the lateral grooves and matched recesses of the new spacers.

6 Claims, 5 Drawing Sheets

METHOD FOR RECONDITIONING A ROTOR OF A TURBOMACHINE

CROSS REFERENCE TO RELATED APPLICATIONS

The present application claims benefit under 35 U.S.C. 119 of Swiss Patent Application No. 01312/11, filed Aug. 9, 2011, the entire contents of which are incorporated by reference herewith as if fully set forth.

FIELD OF THE INVENTION

The present invention relates to the field of thermal turbomachines. It refers to a method for reconditioning a rotor of such a turbomachine, especially a rotor of a gas turbine.

BACKGROUND OF THE INVENTION

Rotors of turbomachines, for example compressors, gas turbines or steam turbines, carry blading consisting of a multiplicity of rotor blades which are inserted into circumferentially extending grooves and retained there. Particularly gas turbine rotors, which are reconditioned for extending the service life, must be frequently hollowed out in the grooves in order to remove worn material (e.g. rust, products of corrosion).

It is the aim in this case that the material becomes "clean" again (and therefore capable of supporting the blading) and that the rotor can go into operation again with new blades and can be operated in an operationally reliable manner until the next inspection.

As a result of the hollowing out of the worn grooves, which become larger, deeper and wider; the grooves obtain a large diameter. This can be compensated by means of specially manufactured rotor spacers. (Rotor spacers are "relatively" inexpensive in comparison to the blades).

The blades themselves are also to be adapted in this respect, but would be time-consuming, costly and lead to further blade variants with subsequent costs for storing, logistics, management, replacement part supply, etc. The production of blade variants for reconditioned rotors should therefore be avoided as far as possible.

For this reason, attempts are frequently made to limit the hollowing out of grooves to a minimum since otherwise the rotor blades acquire an excessively large radial and axial clearance in the grooves.

Consequently, the effectiveness of the hollowing out and of the repair of the rotors is limited, however.

Severely damaged rotors can no longer be hollowed out in this way. A repaired rotor with an excessively large blade clearance can no longer be operated in an operationally reliable manner.

SUMMARY

The present disclosure is directed to a method for reconditioning a turbomachine rotor, which is equipped with circumferentially extending rotor grooves for accommodating rotor blades which are retained in the rotor grooves at a distance from each other by spacers. The method includes removing the rotor blades and spacers from the rotor grooves which are to be reworked and hollowing out the exposed rotor grooves, simultaneously widening the rotor grooves in order to remove damage-inflicted material. The method also includes introducing at least one circumferentially extending lateral groove for accommodating a filler piece in the rotor grooves such that a gap between rotor blades and hollowed-out rotor grooves is filled out by the filler piece. New spacers are provided which are matched to the hollowed-out rotor grooves and have recesses which are matched to the introduced lateral grooves. Filler pieces are provided for inserting into the circumferentially extending lateral grooves and recesses of the new spacers. The rotor blades and new spacers are inserted into the hollowed-out rotor grooves and corresponding filler pieces are inserted into the lateral grooves and matched recesses of the new spacers.

BRIEF DESCRIPTION OF THE DRAWINGS

The invention shall subsequently be explained in more detail based on exemplary embodiments in conjunction with the drawings. In the drawings.

DETAILED DESCRIPTION OF THE PREFERRED EMBODIMENTS

Introduction to the Embodiments

Figure 1:
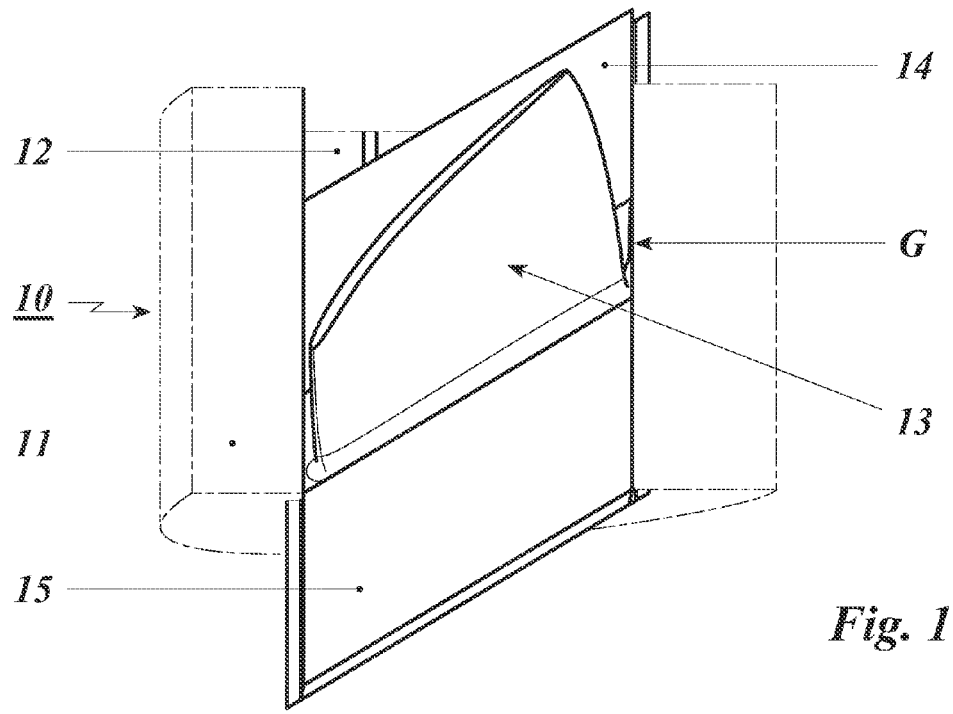
FIG. 1 shows, in a plan view, a section of a circumferentially extending rotor groove—which is suitable for the application of the invention—of a gas turbine rotor with an inserted rotor blade, which is enclosed on both sides by a spacer.

It is therefore an object of the invention to disclose a method for reconditioning a rotor of a turbomachine, especially of a gas turbine, which avoids the disadvantages of known methods and is distinguished by even more extensive hollowing out being applied without replacement of the blades.

This and other objects are achieved by the features of the appended claims.

The method according to the invention for reconditioning a rotor, which is equipped with circumferentially extending rotor grooves for accommodating rotor blades which are retained in the rotor grooves at a distance from each other by spacers, includes the following steps:

removing the rotor blades and spacers from the rotor grooves which are to be reworked;

hollowing out the exposed rotor grooves with simultaneous widening of the rotor grooves in order to remove damage-inflicted material;

introducing at least one circumferentially extending lateral groove in each case for accommodating a filler piece in the rotor grooves in such a way that a gap between rotor blades and hollowed-out rotor grooves is filled out by means of the filler piece;

providing new spacers which are matched to the hollowed-out rotor grooves and have recesses which are matched to the introduced lateral grooves;

providing filler pieces for inserting into the circumferentially extending lateral grooves and recesses of the new spacers; and inserting the rotor blades and new spacers into the hollowed-out rotor grooves and also inserting corresponding filler pieces into the lateral grooves and matched recesses of the new spacers.

In one embodiment of the method according to the invention, the circumferentially extending lateral grooves are provided only on one side of the hollowed-out rotor grooves.

According to another embodiment of the method according to the invention, provision is made for a plurality of circumferentially extending lateral grooves with corresponding filler pieces per hollowed-out rotor groove.

In a further embodiment, the introduced lateral grooves and the matched recesses of the new spacers form tubular passages in the installed state, and filler pieces in the form of small tubes are used.

In yet another embodiment of the method according to the invention, the rotor grooves have circumferentially extending hooks on the sides, which are engaged by the blade root of the inserted rotor blades, and a circumferentially extending lateral groove is arranged above the hooks.

It is also conceivable, however, that the rotor grooves have circumferentially extending hooks on the sides, which are engaged by the blade root of the inserted rotor blades, and in that circumferentially extending lateral grooves are arranged beneath the hooks in each case.

DETAILED DESCRIPTION

It is the idea of the present invention to be able to repair (recondition) even severely worn rotors of especially gas turbines, in which while keeping the rotor blades in an altered state new (matched) spacers are used between the adjacent rotor blades on the one hand and, on the other hand, to fill out the axial clearance, which is created in the rotor blades as a result of the axial hollowing out of the rotor grooves, by means of a filler piece (e.g. a plastically deformable small tube).

Comparable small tubes are used in any case in the blading of the rotor since blades are "underpinned" with a T-root with these in order to press them into the recessed grooves and to already achieve the operating position of the blades during assembly.

The new spacers are designed so that they have a recess/slot in order to at least partially accommodate the filler piece. The reworked rotor also has a lateral groove in the rotor grooves, in which the filler piece is retained.

Figure 2:
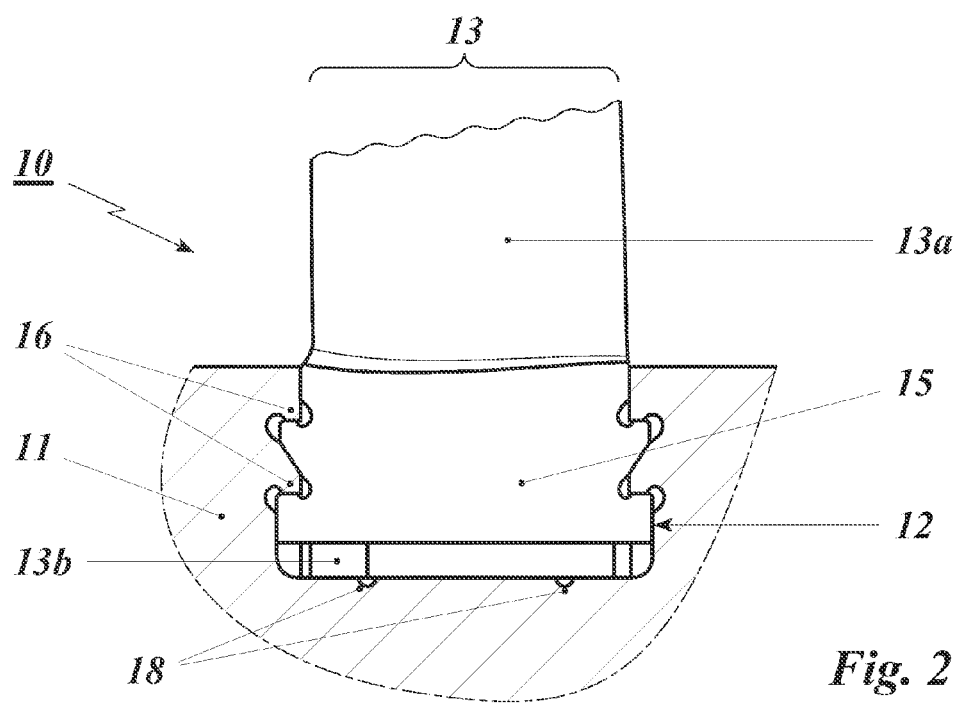
FIG. 2 shows a section through the rotor groove of FIG. 1 with the rotor blade seated therein.

Reproduced in FIG. 1, in plan view from above, is a detail of a gas turbine rotor, with a configuration, as can be the starting point of the present invention. The gas turbine rotor 10 of FIG. 1 has a circumferentially extending rotor groove 12 in a rotor disk 11, in which a rotor blade 13 is retained by its blade root (13b in FIG. 2). The rotor blade 13 is enclosed on both sides by spacers 14 and 15 which create the distance to the adjacent blades (not shown) and cover the rotor groove 12. The rotor blade 13, which extends radially outwards by its blade airfoil 13a, butts by its blade root 13b against a sidewall of the rotor groove 12 in the original state without a gap at a limit G. FIG. 2 shows a corresponding (axial) section through the rotor groove 12. As shown in FIG. 2, arranged on the groove base of the rotor groove 12, are small tubes 18 of a known type per se, by means of which the rotor blade 13 is pressed from the bottom against the hooks 16 which are formed on the sides of the rotor groove 12.

Figure 3:
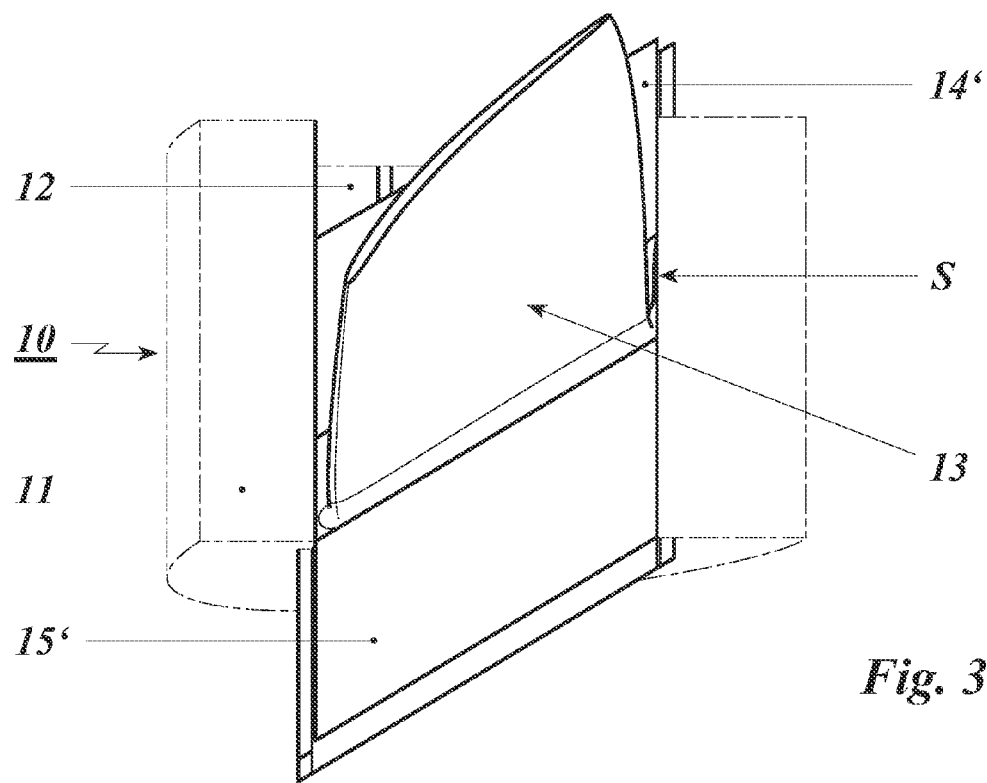
FIG. 3 shows in a view comparable to FIG. 1 the arrangement from FIG. 1 after hollowing out the rotor groove, as a result of which a gap (S) has been created between the rotor blade and one sidewall of the rotor groove.
Figure 4:
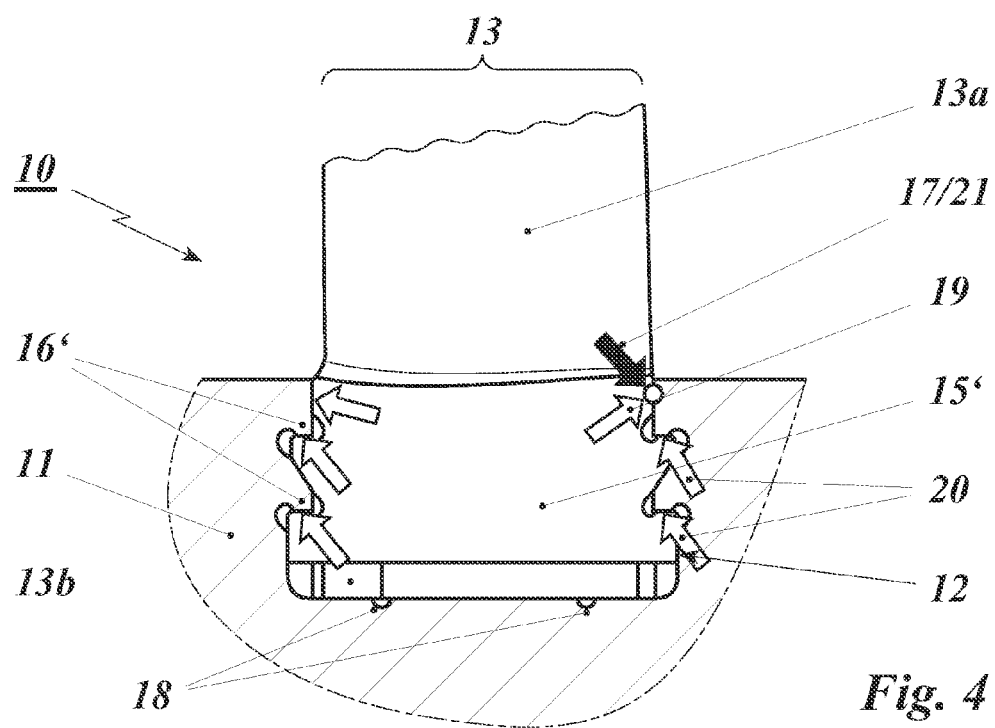
FIG. 4 shows in a view comparable to FIG. 2 the situation created as a result of hollowing out the rotor groove, and also the additionally introduced lateral groove.
Figure 7:
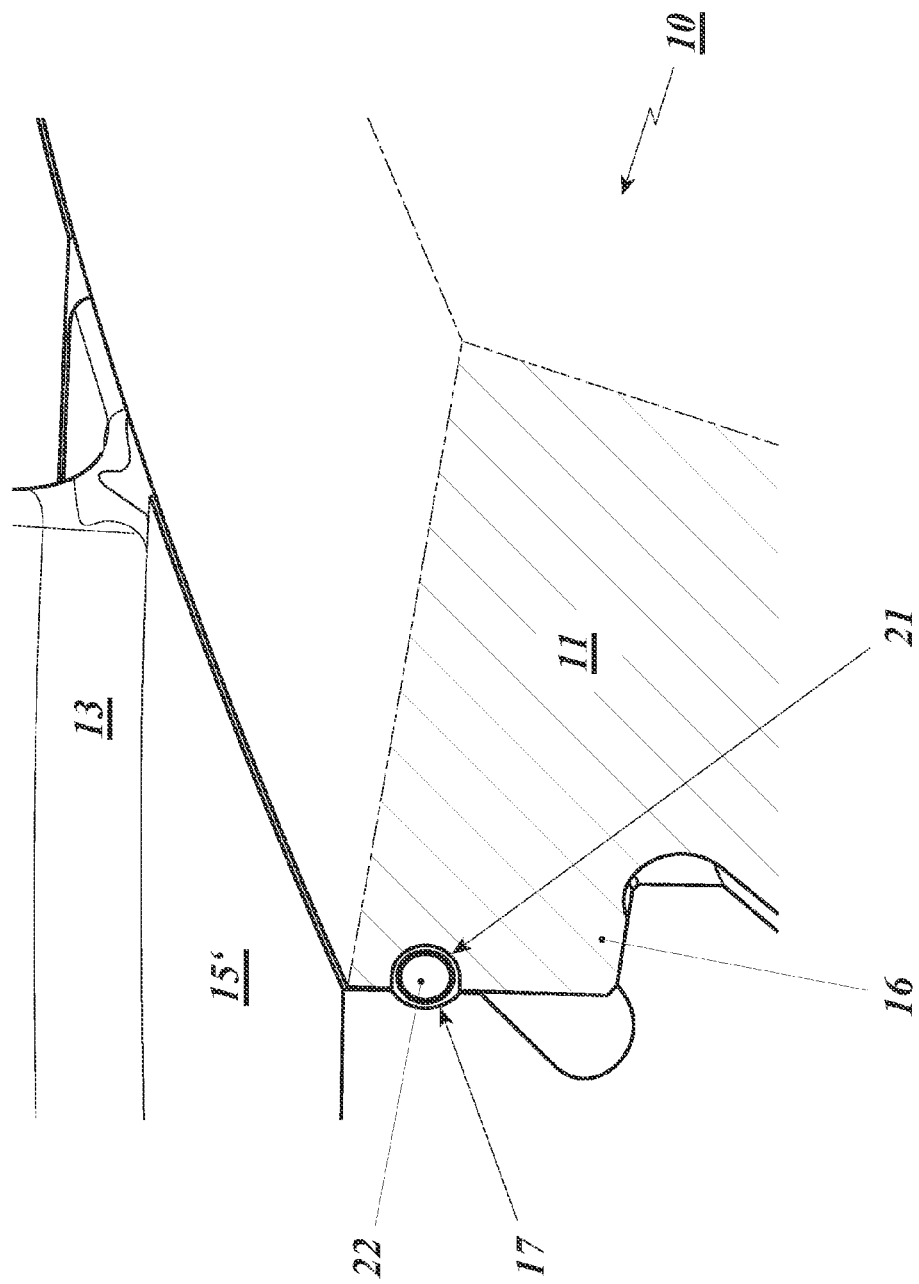
FIG. 7 shows an enlarged detail from the view of FIG. 5 with a filler piece in the form of a small tube.

If now in the course of a reconditioning or reworking the rotor groove 12 is hollowed out for removing defective material and as a result the groove width is enlarged in particular, a situation is created as is indicated in FIG. 3 in a view comparable to FIG. 1: Whereas the hollowed-out and therefore widened rotor groove 12 can be, or is, covered without a gap by means of correspondingly matched new spacers 14' and 15', a gap (S) is created between the non-machined rotor blade 13 and the sidewall of the hollowed-out rotor groove 12 and leads to the rotor blade 13 being retained in the rotor groove 12 with an appreciable clearance. FIG. 4 shows, in a view comparable to FIG. 2, the situation after the reworking. As a result of the hollowing-out actions 20, machined-out hooks 16' (see block arrows) are created on a larger diameter. The hollowing-out 19 leads to an axially wider rotor groove (see block arrows). Also to be seen in FIG. 4, arranged on the right-hand side of the rotor groove 12 above the hooks 16', is a tubular passage which is formed by means of a lateral groove 21 in the rotor groove 12 and an oppositely disposed recess 17, conforming thereto, in the spacers 14', 15' (see also FIG. 7).

Figure 5:
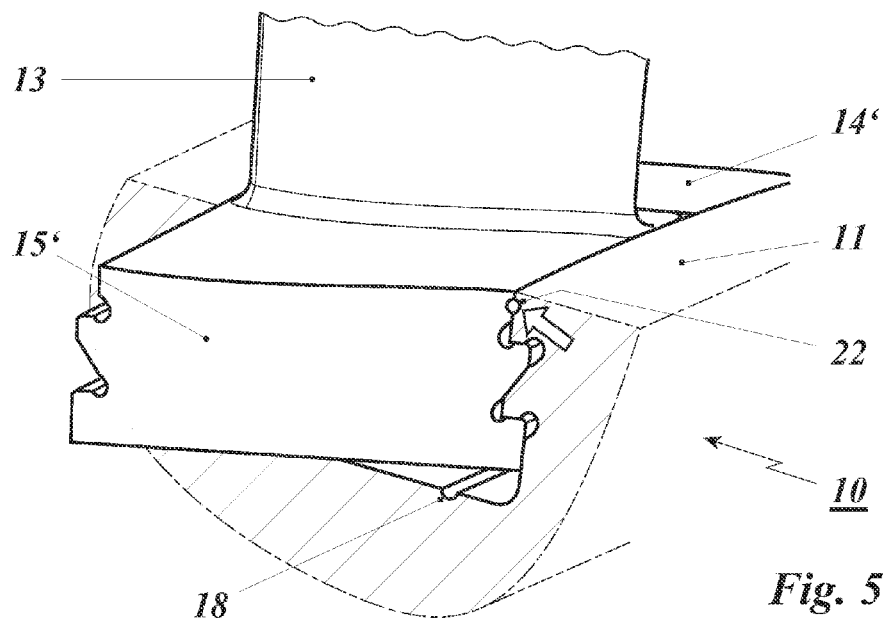
FIG. 5 shows the configuration of FIG. 4 in a perspective view.
Figure 8:
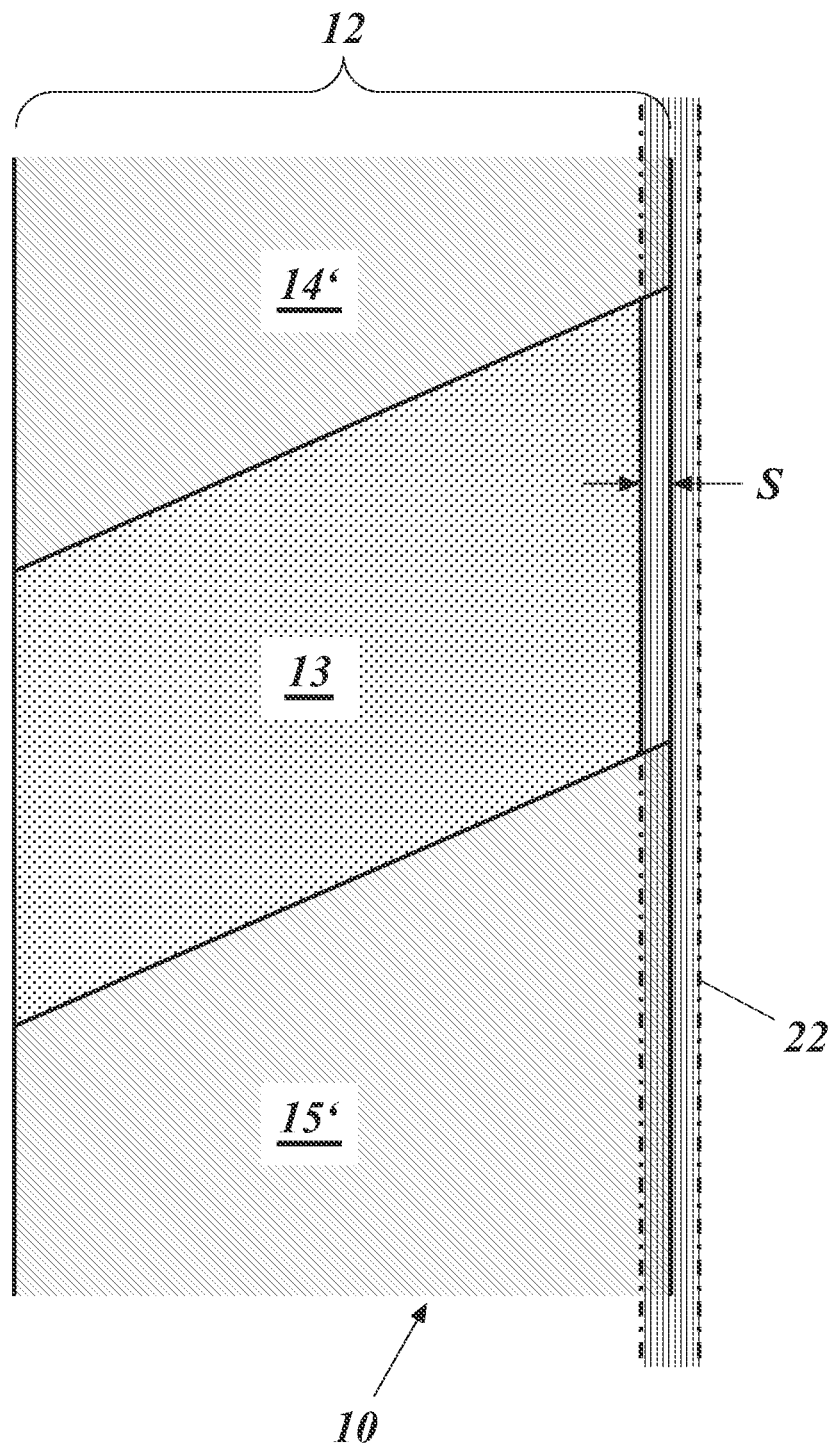
FIG. 8 shows in a schematic view in plan view from above the filling out of the gap (S) between rotor blade and sidewall of the rotor groove by means of a filler piece.

A circumferentially extending filler piece 22 in the form of a small tube is pushed or inserted into this tubular passage 17/21 according to FIG. 5 (see also FIG. 7) and circumferentially traverses and fills out the gap S between blade root 13b and adjacent sidewall of the hollowed-out rotor groove 12 and so ensures a practically clearance-free mounting of the rotor blade in the reworked rotor groove 12. In the exemplary embodiment of FIG. 7, the tubular passage is formed principally by the groove 21 in the sidewall of the rotor groove 12. In this way, a reliable guiding of the filler piece 22 is also provided in the gap S (see also FIG. 8).

Figure 6:
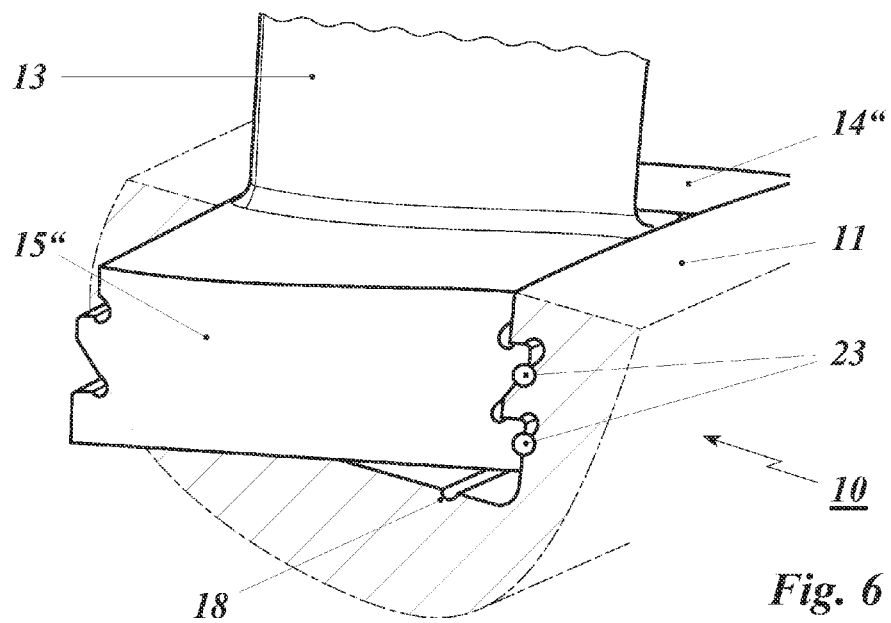
FIG. 6 shows in a view comparable to FIG. 5 a variant of the configuration of FIG. 5.

In FIG. 5, an individual filler piece 22 is provided above the hooks 16 or 16'. It is also conceivable, however, according to FIG. 6, to insert a plurality of filler pieces 23 which can also be positioned at other locations in the sidewall. In the exemplary embodiment of FIG. 6, two filler pieces 23 are arranged beneath the hooks 16 or 16'. The new spacers 14" or 15" are correspondingly matched to this other configuration of the filler pieces.

LIST OF DESIGNATIONS

10 Gas turbine rotor
11 Rotor disk
12 Rotor groove (circumferentially extending)
13 Rotor blade
13a Blade airfoil
13b Blade root
14, 14', 14" Spacer
15, 15', 15" Spacer
16, 16' Hook
17 Recess (groove)
18 Small tube
19, 20 Hollowing
21 Groove
22, 23 Filler piece (small tube)
G Limit
S Gap

What is claimed is:

1. A method for reconditioning a turbomachine rotor (10), which is equipped with circumferentially extending rotor grooves (12) for accommodating rotor blades (13) which are retained in the rotor grooves (12) at a distance from each other by spacers (14, 15), the method comprising:

a) removing the rotor blades (13) and spacers (14, 15) from the rotor grooves (12) which are to be reworked;
b) hollowing out the exposed rotor grooves (12), simultaneously widening the rotor grooves (12) in order to remove damage-inflicted material;
c) introducing at least one circumferentially extending lateral groove (21) for accommodating a filler piece (22, 23) in the rotor grooves (12) such that a gap (S) between rotor blades (13) and hollowed-out rotor grooves (12) is filled out by the filler piece (22, 23);
d) providing new spacers (14', 14", 15', 15") which are matched to the hollowed-out rotor grooves (12) and have recesses (17) which are matched to the introduced lateral grooves (21);
e) providing filler pieces (22, 23) for inserting into the circumferentially extending lateral grooves (21) and recesses (17) of the new spacers (14', 14", 15', 15"); and
f) inserting the rotor blades (13) and new spacers (14', 14", 15', 15") into the hollowed-out rotor grooves (12) and inserting corresponding filler pieces (22, 23) into the lateral grooves (21) and matched recesses (17) of the new spacers (14', 14", 15', 15").

2. The method as claimed in claim 1, wherein the circumferentially extending lateral grooves (21) are provided only on one side of the hollowed-out rotor grooves (12).

3. The method as claimed in claim 1, wherein provision is made for a plurality of circumferentially extending lateral grooves (21) with corresponding filler pieces (23) per hollowed-out rotor groove (12).

4. The method as claimed in claim 1, wherein the introduced lateral grooves (21) and the matched recesses of the new spacers (14', 14", 15', 15") form tubular passages in an installed state, and filler pieces (22, 23) in the form of tubes are used.

5. The method as claimed in claim 1, wherein the rotor grooves (12) have circumferentially extending hooks (16, 16') on sides thereof, which are engaged by blade roots (13*b*) of the inserted rotor blades (13), and a circumferentially extending lateral groove (21) is arranged above the hooks (16, 16').

6. The method as claimed in claim 1, wherein the rotor grooves (12) have circumferentially extending hooks (16, 16') on sides thereof, which are engaged by blade roots (13*b*) of the inserted rotor blades (13), and circumferentially extending lateral grooves are arranged beneath the hooks (16, 16').

* * * * *